3,001,953
TABLETED KAOLIN-HYDRAULIC CEMENT CATALYST
Ronald E. Reitmeier, Middletown, and Paul E. Huber, Louisville, Ky., assignors to Catalysts and Chemicals Inc., Louisville, Ky., a corporation of Delaware
No Drawing. Filed May 22, 1958, Ser. No. 736,991
4 Claims. (Cl. 252—455)

The present invention relates to improvements in the production of hydrogen by the catalytic decomposition of hydrocarbons and more particularly in the preparation of suitable catalysts therefor. The invention relates more particularly to the preparation of catalytic masses which possess the property of cohering in self-supporting units in which the form of the units permits the catalyst and catalyzed material to come into an effective contact during the reaction.

The commercial preparation of hydrogen by the catalytic decomposition of hydrocarbons with steam has assumed great importance in industrial chemical operations, such as in the synthesis of ammonia, alcohols and synthetic fuels as well as providing a source of hydrogen for various hydrogenations. In carrying out these processes it has been found advantageous to employ very active catalysts as for example those that contain nickel, kaolin and magnesium oxide.

One of the major problems which has confronted the industry has been that of bringing the catalyst into intimate, effective contact with the charge material and of maintaining the catalyst surface so that this intimate contact may be continued for a satisfactorily long period of time. According to one theory widely accepted (see "Catalysis" by Berkman, Morrel and Egloff), catalysis is a surface phenomenon. Catalytic activity is believed to be due to unsatisfied valence forces in metallic or metallic oxide atoms by virtue of their position with respect to other atoms in the catalyst. These forces are believed to be smallest within the body of the material and greater near or at the surfaces where these forces are unbalanced and greatest on the edges and points. An amorphous material is generally believed to be more catalytically active than the crystalline form since in crystals secondary forces or valences are considered to be directed toward the crystal's center whereas in amorphous bodies these valences are directed toward the outside of the unit of the material. However, at high temperatures, in the range of 1200–1900° F. such as are encountered in the steam-methane reaction, it is impossible to maintain catalytic material in an amorphous form. As a consequence the surface area of the catalyst is dependent almost entirely upon the size, shape, and macro porosity of the catalyst. This we shall term geometric surface area as opposed to microscopic surface area. In low temperature reactions, amorphous materials do not change or change only slowly to the crystalline form so that the micro porosity of the catalytic constituents is the greatest one factor in contributing to the surface area. Thus, for example in utilizinz carriers such as silica gel, a surface area in the range of 400–600 square meters per gram is obtained by virtue of the innumerable microscopic pores which for the most part are less than 20 angstroms in diameter. With activated alumina, at low temperatures, surface areas (due to the microscopic pores in the material) in the range of 200–350 square meters per gram are obtained. Consequently with these carriers the geometric shape of the catalyst is of slight importance in relation to the surface area of the mass. However, at high temperatures the microscopic surface area is lost and such surface area as is available is due to the size or the shape of the catalyst. Therefore, it is necessary that there be maintained within a given volume the largest practicable geometric surface area which may be brought into contact with the material to be catalyzed. Accordingly, when dealing with a solid catalyst, it is desirable to use it in a form which presents the greatest surface area so that the greatest proportion of the catalyst in the reaction zone takes part in catalyzing the reaction and the highest catalyst efficiency is obtained.

One method of preparing catalysts heretofore employed is that of tableting a granular or powdered catalyst material into various shapes in an endeavor to insure the material retaining the resulting shape during reaction and regeneration. These forms may be rods, cylinders, spheres, spools, etc. in various shapes, sizes and proportions. There are three main purposes for this procedure:

(1) To permit easy handling.
(2) To increase the contact surface of a given amount of catalyst in a given amount of reactor space.
(3) To improve the passage of fluids through the catalyst while increasing the time between regeneration.

Generally, however, the resulting shapes do not have adequate strength, rigidty, crushing resistance, resistance to abrasion upon handling and resistance to thermal shock on being used in conversion and during regeneration. Accordingly the geometric shapes which tend to give the largest geometric surface are apt to break or spall resulting in catalyst fines that plug up the free reaction spaces and increase the pressure drop across the reaction zone.

An object of this invention, therefore, is to provide a method for producing tableted catalyst of various geometric shapes which possess adequate mechanical strength and resistance to abrasion as well as resistance to thermal shock. A more specific object of this invention is to provide a method for preparing a catalyst comprising nickel, kaolin and a hydraulic cement which has exceptional mechanical strength when tableted.

We have discovered that the physical characteristics of this type catalyst are dependent upon two factors, i.e. the concentration of water in the initial mix and the time that elapses between the step of adding water to the cement and the step of tableting the mixture. In order to get the maximum strength from the hydraulic cement, it is necessary to add sufficient water to completely wet the aggregate and the cement with sufficient mixing to thoroughly disperse the various constituents throughout the mixture. This produces a plastic mud which must be dried sufficiently to form a powder with the proper rheological characteristics for tableting. However, if the mud is dried, the initial set of the cement is lost and the strength of the tableted catalyst suffers. If only enough water is initially used to form a crumbly mass, suitable for tableting, the cement does not hydrate properly and optimum strength does not develop in the finished catalyst.

According to this invention catalysts of superior physical properties are prepared by admixing hydraulic cement with kaolinitic clay to which optionally may be added non acidic metal salts or oxides, and sufficient water to thoroughly wet the mass and form a heavy plastic mud. To this mud is then added sufficient dry adsorbent which is mixed therewith to form a crumbly granular mass. This material is then tableted as soon as possible into the desired shape. In this manner the initial set of the cement occurs in the tableted catalyst which coupled with the compression of the tableting operation produces a tablet of surprising strength. The tableted catalyst may then be cured by being sprinkled or sprayed with water for several days and then are preferably shrunk by calcination at a temperature in the range of from 1200–1800° F.

As used in this application kaolinitic clay is defined as a material resulting from the natural weathering of feldspar and includes both primary kaolins such as china clay or secondary kaolins such as ball clay. Such clays are unique materials found in large quantities in nature and are readily distinguishable from and have definite advantage over other materials proposed for this purpose. We are aware that certain naturally occurring materials such as fuller's earth, bentonite and montmorillonite and similar mineral adsorbent substances have been mentioned for use in catalysts of this type. However, none of these materials has the desirable properties of the kaolinitic clays as will be apparent from the following characterizations and properties. Kaolinitic clays are of a natural plastic nature having remarkably high uniformity in their properties and are composed of silicon, oxygen and hydrogen according to the general formula $$Al_2O_3 2SiO_2 2H_2O$$

They are sometimes referred to as comprising aluminum silicates but are probably composed of aluminosilicic acid.

Kaolinitic clays differ from the adsorbent clays and can, therefore, be distinguished therefrom in the following respects. Infusorial earth, kieselguhr, or silica gel are siliceous materials and are, therefore, entirely different in composition and properties in that they lack plasticity and the property of hardening. Fuller's earth is not a true clay in that it lacks plasticity entirely and it is readily fusible unlike china clay. Montmorillonite also has very little plasticity. It is composed largely of hydrogels of silica and is decomposed by boiling acids such as HCl. Bentonite, while highly colloidal, also lacks plasticity. Both montmorillonite and bentonite have a much higher silica to alumina ratio and water content than do the kaolinitic clays. They are both amorphous whereas the kaolinitic clays show a crystalline X-ray structure.

Hydraulic cements as used in this application include the familiar Portland cement, blast furnace or slag cements or the cements consisting primarily of calcium aluminates which are sold under the trade name of Ciment Fondu, Rolandschutte or Lumnite. In addition, slaked lime or quick lime when mixed with water forms a mortar which has a cementing action. The first class of cements, namely the Portland cements, are composed primarily of calcium silicates and upon setting liberate free calcium oxide. Generally gypsum (calcium sulfate) is added to retard the setting of Portland cement. This is sometimes disadvantageous in the preparation of catalysts in that under reaction conditions, with hydrogen at high temperatures, $H_2S$ is liberated which tends to temporarily poison the catalyst in the reactor. The aluminous cements, on the other hand, utilize another type of retarder and, therefore, do not offer the same problem as does the gypsum retarders utilized in Portland cements. We have found, however, that one of the most preferred cements which can be utilized comprises ground Portland cement clinker to which gypsum has not been added. When ground Portland cement clinker is utilized according to the method of this invention, a quick initial set is obtained in the tabletted catalyst which would be largely lost if the catalyst were prepared in the conventional manner. Further the ground clinker is substantially free of sulfur, resulting in an active, physically rugged catalyst which requires no further treatment to reduce the sulfur content thereof. Other hydraulic cement such as slaked lime, zirconium cement and magnesium cement may be utilized to advantage.

The rate of setting varies to some extent with the type of cement utilized. Thus Portland cement clinker sets slower than ground Portland cement clinker due to the presence of the retarder in the former. Slaked lime sets at about the same rate as does the ground clinker. The aluminous cement composed primarily of calcium aluminate set faster than the Portland cement clinker and the zirconian cements set faster than the aluminous cements. Thus the time between the addition of water to the cement and the tabletting step is somewhat dependent upon the type of cement utilized. Generally we have found when using Portland cement, clinker or slaked lime that good results are obtained if the material is tabletted within 4 to 6 hours. If the aluminous cements are utilized the material should be tabletted within 2 to 3 hours. If zirconium cement is used the material should be tabletted within an hour after the addition of water. In all cases it is advantageous to tablet the material as soon as possible after the water has been added to the cement-aggregate admixture.

The concentration of the various constituents of the catalyst may vary over a considerable range. The nickel concentration may range from four to thirty-five percent by weight (as metal) of the total composite. Other factors being equal, the higher the concentration of nickel in the catalyst the higher the activity of this catalyst. We have found, however, that a suitable concentration of nickel lies within the range of from about 15–30%. The catalysts are preferably promoted with the oxides of the metals on the left hand side of the second group of the periodic table, viz. magnesium oxide, calcium oxide, barium oxide or strontium oxide. These materials may be added by coprecipitating with the nickel constituent or by merely admixing same with the nickel salt.

A metal oxide such as magnesia in a concentration of about 4 to 15% by weight of the total composite is preferred. Other promoters, such as chromium oxide or aluminum oxide may be used to promote the nickel and if utilized are preferably added by coprecipitation from a solution of nickel and the promoting metal. This class of promoters should not exceed about 5 percent by weight of the total catalyst composite and as little as 1 percent by weight has been found effective. The kaolinitic clay should constitute at least 20 percent by weight of the finished catalysts and may constitute as much as 80 percent by weight. The hydraulic cement preferably is utilized in a concentration of between 20–30% by weight of the finished catalyst, however, as little as 12% by weight may be utilized with favorable results, especially if it is desired to produce a catalyst containing a high concentration of nickel.

The method of preparing and treating the various constituents of the catalyst may vary appreciably. We have found for example that one of the most economical nickel salts is nickel nitrate prepared by dissolving metallic nickel in nitric acid. However, if a catalyst containing between 20–30% by weight of nickel (as metal) is desired an aqueous solution of nickel nitrate mixed with kaolin produces a mass which is too wet to work properly in conventional mixing machinery. Accordingly a mixture of dry commercial nickel carbonate and an aqueous solution of nickel nitrate may be utilized to impregnate the kaolin and form a mud of a proper consistency for easy working. Alternately, nickel hydroxide or carbonate may be precipitated from the nitrate solution by the addition of ammonia, sodium carbonate or milk of lime in which case it may be advantageous to add a promoter such as a salt of chromium or aluminum which is simultaneously precipitated with the nickel carbonate or hydroxide. The resulting precipitate may then be filtered or thickened by use of suitable thickening apparatus such as a Dorr-Oliver thickener and kneaded with the kaolin and group II metal salt promoter. The kaolin and promoters may also be impregnated with nickel nitrate and subsequently calcined and reimpregnated until the proper concentration of nickel is obtained. The wet mud is then calcined to decompose the metal salts to the oxides and the dry mixture is admixed with the hydraulic cement. Sufficient water is added to produce a thick mud and sufficient dry adsorbent is mixed in to produce an easily flowable granular mass. Alternately kaolin and hydraulic cement may be admixed with water to form the proper heavy plastic consistency and the powdered dry adsorbent may then be added to form a tabletable admixture. In this case the cured tablets may be impregnated with the active metal salts to form suitable catalysts. The amount of water added depends upon the amount of kaolin and the amount of cement utilized. We have obtained good results utilizing between about 25 to about 40% water by weight of the total composite. However, the proper amount of water to be added is best determined empirically by the "feel" of the admixture and its adhesiveness toward metal (for instance, on the muller faces or on the blade of a spatula).

The adsorbents utilized may be either of a carbonaceous or non-carbonaceous nature. We have found that inorganic adsorbents having a needlelike macro structure are especially suitable and tend to impart considerable rigidity and strength to the finished catalyst. Kieselguhr is an excellent example of an adsorbent of this type. The carbonaceous adsorbents are especially suitable since upon calcination they are decomposed and form large macro pores which increase the geometric surface area of the catalyst. Such adsorbents include starch, charcoal, methyl cellulose, sawdust, wood flour, etc. An added advantage of the carbonaceous adsorbents resides in the fact that when the catalytic metals are admixed with the kaolin-cement mixture, the desired concentration of catalytic metal is not altered, since the carbonaceous adsorbents are removed upon calcination. We prefer to take advantage of the beneficial properties imparted by each class of adsorbents and utilize a mixture of each class such as kieselguhr and wood flour. The amount of granular adsorbent utilized will vary from batch to batch depending on the amount of water which must be adsorbed. However, generally from 5 to 10 by weight of the composite is sufficient. It should be pointed out here that the induced pores formed by the combustion of carbonaceous adsorbents usually have diameters of several thousand angstroms and, therefore, constitute a difference in kind over the naturally occurring micro pores which are destroyed by sintering of the catalyst mass at process temperatures.

Reference is now made to the following examples which further illustrate this invention.

*Example 1*

A conventional catalyst was prepared as follows: 184 parts by weight of nickel powder was dissolved in nitric acid. The resulting nickel nitrate solution was diluted with water and an aqueous sodium carbonate solution (containing 384 parts by weight of sodium carbonate in about 3500 parts by weight of water), was added. The precipitate was filtered, and the filter cake washed with water at about 40° C. and dried.

A third of the filter cake was then mixed in a Simpson Mix Muller with about 178 parts by weight of Kentucky ball clay, 76 parts by weight of magnesium oxide and an aqueous nickel nitrate solution containing about 36 parts by weight of nickel as a 15 percent solution. The resulting mud was then calcined for about 7 hours at about 900° F. which converted the nickel salts to nickel oxide. About 50 parts by weight of the powder was mixed with about 15 parts by weight of hydraulic cement and about 25 parts by weight of water. This material was allowed to air dry for about 12 hours and was then granulated through a 12 mesh screen. 3% of graphite was added and the material was tableted into 5/8 inch rings. The rings were stacked and sprinkled with water twice daily for 3 days. The rings were then calcined at a temperature of about 1600° F. for 6 hours. The side crush strength of the finished catalyst averaged about 45 pounds.

*Example 2*

A batch of catalysts was prepared as follows: 5,000 parts by weight of kaolin containing about 35% by weight of nickel (obtained by calcination of kaolin and nickel salts as in Example 1) was admixed with 250 parts by weight of Kentucky ball clay, 1,500 parts by weight of ground Portland cement clinker, 215 parts by weight of graphite and 2,360 parts by weight of water. This admixture was mulled in a Simpson Mix Muller to form a heavy mud. A total of 600 parts by weight of Kentucky ball clay was added continuously to the mud until the admixture became sufficiently dry for tableting. The granular material was immediately tableted into 5/8 inch rings. These rings were stacked and sprinkled twice daily with water for 3 days. The cured rings were then calcined for 8 hours at 1600° F. The side crush strength of these rings averaged over 120 pounds.

*Example 3*

Another batch of catalyst was prepared in the same manner as that of Example 2 except that the mixture after becoming granular by the addition of the 600 parts by weight of Kentucky ball clay was allowed to air dry for 20 hours before tableting. The 5/8 inch rings, after curing had an average crush strength of slightly over 51 pounds.

It will be noted that catalysts prepared according to this invention (Example 2) had a crush strength of over twice that of the catalyst of Examples 1 and 3. By utilization of the process of this invention, catalysts of superior physical properties and superior activity due to the increased geometric area are produced. When a carbonaceous adsorbent is used the advantage in strength, obtained because of the initial set of the cement and the compression afforded by the tableting step, more than compensates for the strength that is lost upon burning out of the carbonaceous adsorbent. This advantage enables the practical utilization of methods which increase the geometric surface of the catalyst such as the tableting of spools, rings and saddles or the use of pore induction techniques with these or more conventional catalyst shapes.

It is obvious that many variations and modifications will occur to those skilled in the art, which do not depart from the spirit and scope of this invention; therefore, only those limitations should be imposed as are encompassed by the appended claims.

We claim:
1. A method of preparing a tableted supported nickel catalyst having improved strength comprising mixing a nickel salt and kaolinitic clay in the presence of sufficient water to form a mud, calcining said mud for a time and at a temperature to provide a dry product in powder form, mixing said dry product with about 12–30% of hydraulic cement and about 30 to about 40% of water based upon the weight of mud dry product to form a cement containing mud, adding from 5–10% by weight of the catalyst of a dry powdered adsorbent selected from the group consisting of kieselguhr, starch, charcoal, methyl cellulose, and wood flour, said mixing being continued for a period of time to cause the cement in said mud to adsorb water from said mud to form a mass which is readily granulated through a screen, said adsorbent cutting down the time for forming a granulated mass by adsorbing water from said mud, granulating said mass after said time through said screen and tableting said granulated mass into the desired shape, the time for tableting said granulated mass being within six hours from the time said cement is added to said mud.

2. The method of claim 1 wherein an additional portion of ball clay is added to said mixture of clay, hydraulic cement, adsorbent and water prior to granulating and said granulated mass is tableted substantially immediately after screening.

3. A tableted catalyst prepared by the method of claim 1.

4. A method of preparing a tableted supported nickel catalyst having improved strength comprising mixing a nickel salt and kaolinitic clay in the presence of sufficient water to form a mud, calcining said mud for a time and at a temperature to provide a dry product in powder form, mixing said dry product with about 12–30% of hydraulic cement and about 30 to about 40% of water based upon the weight of dry product to form a cement-containing mud, adding an amount of dry clay to cement-containing mud while mixing to adsorb water in said dry clay, said mixing being continued for a period of time to cause the cement in said mud to adsorb water from said mud to form a mass which is readily granulated through a screen, said dry clay cutting down the time for forming a granulated mass by adsorbing water from said mud, granulating said mass after said time through said screen and tableting said granulated mass into the desired shape, the time for tableting said granulated mass being within six hours from the time said cement is added to such mud.

References Cited in the file of this patent

UNITED STATES PATENTS

| | | |
|---|---|---|
| 2,056,911 | Schiller | Oct. 6, 1936 |
| 2,840,531 | Fleming | June 24, 1958 |

OTHER REFERENCES

Faragler et al.: "Manufacture and Regeneration of Catalysts," U.S. Bureau of Mines Information Circular 7368, p. 5, July 1946.

Holroyd: "Report on Investigations of Fuels and Lubricants," U.S. Bureau of Mines Information Circular 7375 p. 37, August 1946.